Sept. 20, 1955   W. C. MEILANDER ET AL   2,718,292
MAGNETIC CLUTCH

Filed June 30, 1952   2 Sheets-Sheet 1

INVENTORS
WILLARD C. MEILANDER
ROCCO DE MASI

BY George Sipkin
B. L. Zangwill
ATTORNEYS

Sept. 20, 1955  W. C. MEILANDER ET AL  2,718,292
MAGNETIC CLUTCH
Filed June 30, 1952  2 Sheets-Sheet 2

INVENTORS
WILLARD C. MEILANDER
ROCCO DE MASI
BY
ATTORNEYS

United States Patent Office 2,718,292
Patented Sept. 20, 1955

2,718,292

MAGNETIC CLUTCH

Willard C. Meilander, Atwater, Ohio, and Rocco De Masi, Arlington, Va.

Application June 30, 1952, Serial No. 296,504

9 Claims. (Cl. 192—40)

(Granted under Title 35, U. S. Code (1952), sec. 266)

The invention herein described may be manufactured and used by the Government of the United States of America for governmental purposes without the payment of any royalties thereon or therefor.

The present invention relates to an electromagnetic clutch, and more particularly to an electromagnetically operated clutch employing tapered rollers interconnecting the relatively rotating parts.

Many electromagnetic clutches have been proposed and built in the past. Some of these clutches have employed friction discs and have therefore been either engaged or disengaged without intermediate stages. Induction clutches have also been built in which relative movement of a driving electromagnet and a driven squirrel-cage rotor transmits a torque to the driven rotor and which depends upon the strength of the magnetic field. While the slippage of the driven member, relative to the driving member, may be regulated by adjustment of the magnetic field, the slippage cannot be completely eliminated because of the inherent nature of the device. Still other clutches have employed discs revolving between two parallel magnetic plates and a mixture of iron particles in oil, the fluid within the housing providing adequate cooling and preventing separation of the magnetic particles from the fluid by centrifugal force at any but low speeds. The instant invention has the following advantages over the above-mentioned magnetic fluid clutch:

(a) The magnetic bearing clutch can be operated at higher rotational speeds since there are no iron particles to be thrown outward and cause leaking of the clutch members.

(b) There is no problem of sealing, since the magnetic bearing clutch contains no fluid mixture.

(c) the dissipation of heat is not serious in the magnetic bearing clutch, due to the absence of heat generating conditions such as drag of seals on the bearing shafts and viscous drag of a fluid mixture in the clutch. This new design does away with the need for protection against vaporization of the oil in the mixture.

The present invention overcomes the disadvantages of the clutches previously known in the art while retaining the advantages by interconnecting the driven and driving shafts through a pair of parallel discs of magnetic material having bevelled surfaces on adjacent faces, each connected to a respective shaft and a plurality of rollers of magnetic material bearing on said bevelled edges. An electromagnetic coil producing a field having flux lines passing through the discs and rollers is provided to attract the rollers to the discs and to vary the pressure therebetween. In addition to the friction drag of the rollers, the magnetic flux passing through the rollers creates a magnetic drag tending to prevent rotation of the rollers. Thus the magnetic field produces a frictional drag and a magnetic drag, each having a strength proportional to the intensity of the magnetic field. Thus, the drag produced by the clutch may be varied over wide limits by varying the strength of the magnetic field.

It is an object of the present invention to provide an electromagnetic clutch controllable over a wide range of torque transmission.

It is a further object of the present invention to provide an electromagnetic clutch employing a plurality of rollers interconnecting the driven and driving shaft.

It is a still further object of the present invention to provide an electromagnetic clutch employing a plurality of rollers, actuated by an adjustable magnetic field.

Further objects and advantages of the present invention will be made more apparent by reference to the following description and to the appended drawings in which Fig. 1 is a longitudinal sectional view through the electromagnetic clutch of the present invention.

Figure 1:
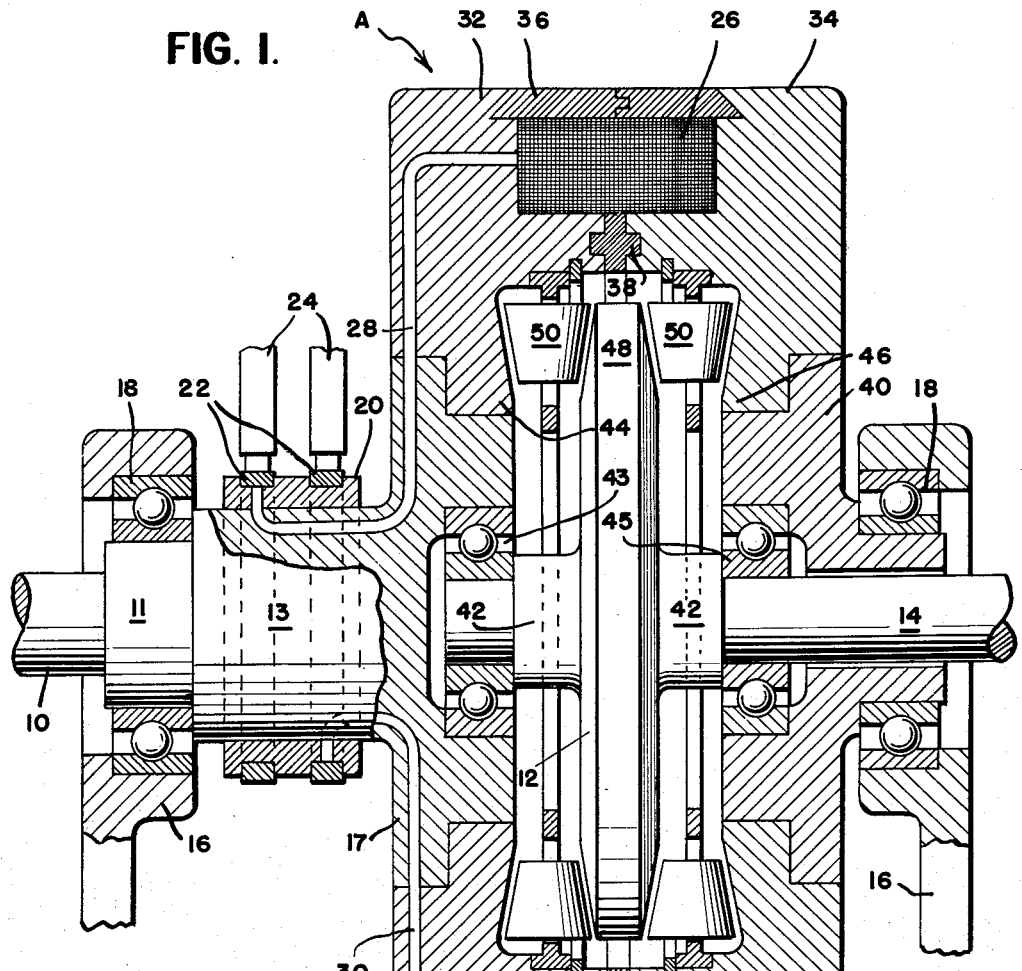

Referring now to the drawings, and more particularly to Fig. 1, there is generally shown at A an electromagnetic clutch having connected thereto a driving shaft 10 adapted to be connected at one end to a prime mover (not shown) and at its other end to the main housing of the clutch. The shaft 10 is directly connected to the main body of the clutch, and the clutch therefore revolves with and at the same speed as the shaft. A disc 12 is located within a hollow portion of the clutch and extending laterally from the disc and perpendicular to the clutch body is a driven shaft 14. The driving shaft 10 has an outwardly protruding flange 11 and is properly supported and centered by means of supporting member 16, which is centrally hollow to receive a ball bearing race 18 to provide for non-frictional rotation of the driving shaft. A hub 13 of non-magnetic material is rigidly fixed to the built up section 11 of shaft 10. Insulation member 20 is secured around hub 13 by any appropriate means, and is provided with a pair of openings to receive slip rings 22. Electrical conductors 24 are connected to said slip rings to serve as supply and return leads for supplying electrical energy to coil 26, positioned in the outer extremities of the clutch. Coil 26 is appropriately connected to the slip rings by means of supply and return conductors 28 and 30 respectively. As mentioned above, the main body of the clutch comprises two circular hollow mating magnetic members or poles 32 and 34 for containing coil 26 and enclosing disc 12, which are secured together by means of a dovetailed slot and key arrangement 36 and pressed on to hubs 13 and 40. A non-magnetic ring 38 having beveled edges is adapted to fit into matching grooves formed in magnetic members or poles 32 and 34 and the ring not only serves to secure poles 32 and 34 together, but also to limit the path of flux in the magnetic circuit. The disc 12 is centered within the opening provided by the poles and hubs 13 and 40 by means of reduced shaft portions 42 respectively extending outwardly from each side of the disc. The ball bearing races 43 and 45 are respectively fitted around the reduced shaft portions 14 of disc 12 thus allowing non-frictional rotation of poles 32 and 34 about disc 12. The inner ends of the pole faces 44 and 46 and the outer extremity 48 of the disc 12 are appropriately slanted to receive a plurality of rollers 50 which are tapered to the slant of the pole faces and the disc. These rollers are held in place by axial shafts which are connected to parts of the bearing retaining element or by the mere configuration of the parts as shown, and when the clutch is not in operation, form a loose fit in the openings provided therefor. However, when the clutch is operative the tapered rollers are pulled inwardly towards the center of the disc by means of magnetic flux and when in this latter position, engage pole faces 44 and 46 and the slanted edges of the outer extremity 48 of disc 12, thus obtaining a locking engagement between the rotating poles 32 and 34 and disc 12. The means for obtaining the magnetic force for moving tapered rollers 50 comprises above mentioned coil 26, which is fitted into the outer portions of poles 32 and 34.

The operation of the device is as follows:

When it is desired to transfer force from driving shaft 10 to driven shaft 14, electrical energy is supplied through conductors 24 to coil 26. The latter is energized thus setting up a field of magnetic force having a magnetic circuit comprising pole 32, pole face 44, tapered rollers 50, disc 48, pole face 46 and pole 34. It will be noted that the pole faces 44 and 46 are positioned inwardly from tapered rollers 50 so that the magnetic field thus set up causes the tapered rollers to move radially inward and into physical contact with the pole pieces 44 and 46 and the slant side of disc 12. The torque exerted from the input through the tapered rollers to the output disc then varies with the magnitude of the magnetic field, since the rolling friction between rollers and the contact surface on the pole pieces and the output disc varies with the field. When the coil 26 is deenergized the magnetic field is removed and the tapered rollers are thrown radially outward and out of contact with the output disc 12, thus resulting in a lack of transmission of torque through the clutch.

Figure 2:
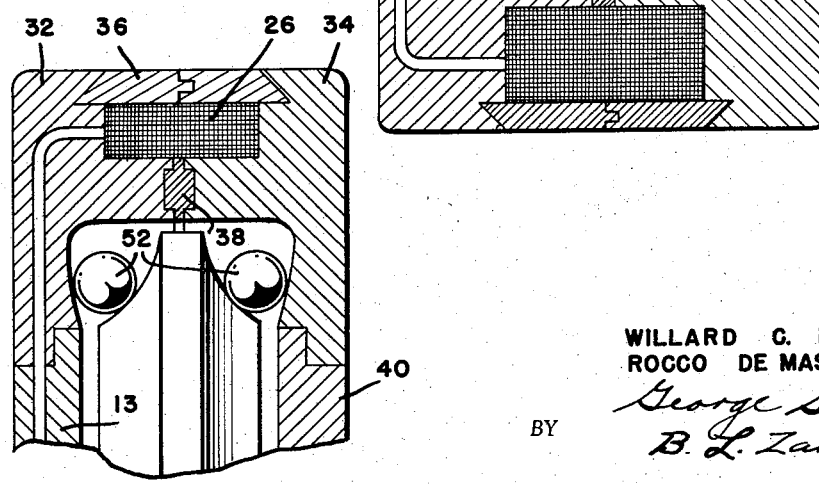
Fig. 2 is an enlarged vertical sectional view of a modification of the electromagnetic clutch showing the use of spherical members for locking the driving to the driven members of the present invention.

The modification shown in Fig. 2 embodies the same structure of Fig. 1, with the exception that the rollers 50 are replaced by spherical members 52. The advantage of using spherical members rather than the tapered rollers of Fig. 1 is that wear is equally distributed over the whole circumference of the spherical members, rather than only the tapered edges that come in contact with the disc in the inward sides of the poles.

Figure 3:
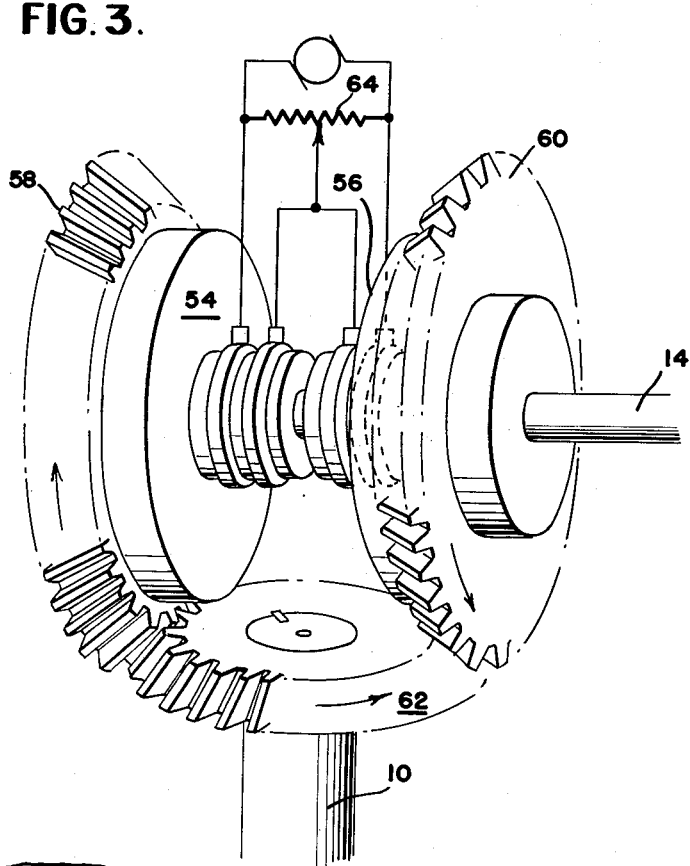
Fig. 3 is a detailed view, partially in section, showing an additional modification of the electromagnetic clutch of the present invention.

The embodiment shown in Fig. 3 is another and more useful embodiment of the basic clutch in which the output shaft 14 is made to rotate in either direction without changing the direction of rotation of the driving or input shaft 10. This arrangement consists of two basic clutches 54 and 56 respectively connected to a pair of beveled gears 58 and 60, which are connected to a like beveled gear 62 in such a way that each of the gears containing the clutches is made to rotate in opposite directions, as indicated by the arrows. Slip rings are provided for each clutch 54 and 56 and power is supplied thereto by any electrical power means, such as a generator, as shown, having a high resistance 64 connected in parallel therewith. When the slider is in the center position of the resistance the amount of current flow will be insufficient to cause energization of the magnetic circuits within either clutch. Since only one of the clutches is to be used at any one time, according to the direction of rotation desired by output shaft 14, the resistance is provided with a sliding contact so that either a small or great amount of such resistance can be cut into the circuit, thus energizing only that coil in the clutch that is made operative. For example, if it is desired to achieve rotation of output shaft 14, in a clockwise direction, the slider is moved toward the extreme right position on resistance 64, thus providing a flow of current to the coil in clutch 54 for energization thereof to bring the tapered rollers spherical members into contact with the disc for transmitting power from the revolving clutch housing to the output shaft 14.

Figure 4:
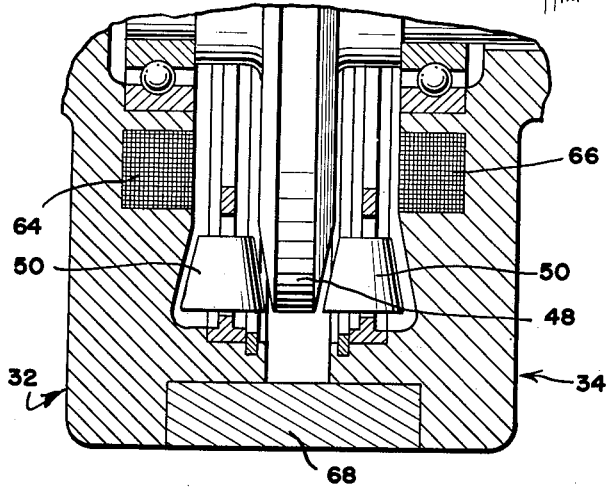
Fig. 4 is a sectional view in elevation of another modification of the instant invention showing the use of a pair of coils for creating the magnetic field.

The modification shown in Fig. 4 is substantially the same as that in Fig. 1 with the exception that coil 26 is replaced by two coils 64 and 66. A large ring of non-magnetic material 68 is inserted in the outer periphery of the poles and this is utilized to confine the magnetic circuit of each of the coils to the area respectively adjacent thereto, so that upon energization of such coils, the tapered rollers will be pulled into contact with the sides of the poles and the disc, thus transferring power from the input to the output as adequately set forth above.

It is to be noted that in each of the modifications described, the pole faces are designed in such a fashion as to have the tapered rollers spherical members located in a position which is outward from such pole faces. In other words, the air gap is necessary for the proper operation of the device and when the coil is energized the flux in crossing such air gap is diverted through the magnetic rollers thus pulling them into the air gap and locking them in position between the poles and the disc.

It is understood, of course, that the foregoing disclosure relates only to preferred embodiment of the invention and that numerous modifications or alterations may be made therein without departing from the spirit and scope of the invention as set forth in the appended claims.

What is claimed is:

1. A magnetic clutch having a housing adapted for connection to an input shaft, said housing comprising a pair of integrally connected hollow poles forming a hollow chamber therein, a centrally mounted disc in said hollow chamber adapted for rotation with said housing, an output shaft connected to said disc, a plurality of rollers positioned between said disc and said poles and being of a size sufficient to bridge the gap therebetween, a coil, means mounting said coil in said poles adjacent the outer periphery of said poles, a non-magnetic ring adjacent said coil in said poles whereby energization of said coil magnetically pulls said rollers into contact with said poles and said disc transferring power from said input shaft to said output shaft.

2. A magnetic clutch comprising a pair of spaced non-magnetic hubs, an input shaft mechanically connected to one of said hubs, a pair of integrally connected poles mounted exteriorly of said hubs forming a hollow chamber therewith, a disc having inwardly tapered edges on the outer periphery thereof and centrally mounted in said hollow chamber, an output shaft mechanically connected to said disc, a coil positioned in the outer portion of said poles, a plurality of rollers in the area formed by the tapered edges of said disc and said poles whereby energization of said coil pulls said rollers into contact with said poles and said tapered edges transferring power from said input shaft to said output shaft.

3. The combination according to claim 2 wherein said rollers comprise a plurality of spherical members.

4. A clutch comprising a plurality of juxtaposed members of magnetic material mounted for rotation about a common axis, said members being generally cylindrical in form with the ends thereof having inclined surface portions whereby a space tapering inwardly toward said axis is formed between the said members, a plurality of elements of magnetic material interposed in the space between the inclined surface portions of adjacent members and mounted for radial movement with respect to said axis, said elements bridging the said space and engaging said surface portions when in their inward position, and magnetic means to apply a magnetic field to the structure including said magnetic members and said elements for drawing said elements to said inward position and in frictional contact with said pair of members of magnetic material, thereby frictionally and magnetically locking said members for unitary rotation according to the degree of magnetizing force produced by said magnetic means.

5. A clutch comprising a pair of members of magnetic material mounted for rotation about a common axis, at least one of said members having a generally conical end portion axially spaced from said other member whereby a space tapering inwardly toward said axis is formed between said members, a plurality of elements of magnetic material interposed in said space and mounted for radial movement with respect thereto, and magnetic means to apply a field to the magnetic structure including said members and said elements for drawing said elements into frictional contact with said pair of members of magnetic material, thereby frictionally and magnetically locking said members for unitary rotation according to the degree of magnetizing force produced by said magnetic means.

6. A clutch according to claim 5 wherein said elements of magnetic material are of such size and shape as to engage the end portions of said members of magnetic material when in their innermost position with respect to said axis.

7. A clutch according to claim 5 wherein said elements of magnetic material are in the form of tapered rollers having their axis of rotation perpendicular to the axis of rotation of the members of magnetic material.

8. A clutch comprising a plurality of rotary magnetic members axially spaced along a common axis of rotation to form a flux path of magnetic material having air gaps between the faces of adjacent magnetic members, a plurality of roller elements of magnetic material mounted within said gaps for rotation about axis perpendicular to said axis of rotation and for radial movement with respect to said axis of rotation, and magnetic means to apply a magnetic flux to said flux path, whereby said roller elements tend to move outwardly from said axis of rotation by centrifugal force and are pulled inwardly by the application of magnetic flux to said flux path.

9. A clutch comprising a plurality of rotary magnetic members axially spaced along a common axis of rotation and forming a flux path with air gaps between the faces of adjacent magnetic members, tapered roller elements mounted on the faces of at least some of said magnetic members about axes perpendicular to said axis of rotation, said tapered roller elements being free to rotate about their own axis and to move radially with respect to said axis of rotation and means to apply a magnetic field to said flux path to cause said flux path to cause said tapered roller elements to be drawn inwardly toward said axis of rotation to engage both member faces bounding the air gap to clutch said members to one another.

References Cited in the file of this patent

UNITED STATES PATENTS

| 2,300,223 | Hottenroth | Oct. 27, 1942 |
| 2,462,393 | Haynes | Feb. 22, 1949 |
| 2,534,093 | Willard | Dec. 12, 1950 |
| 2,575,360 | Rabinow | Nov. 20, 1951 |
| 2,596,654 | Clark | May 13, 1952 |

OTHER REFERENCES

Product Engineering, April 1951, pp. 114–116.